United States Patent
Gill et al.

(10) Patent No.: US 8,504,083 B1
(45) Date of Patent: Aug. 6, 2013

(54) ANALYSIS OF MESSAGE SERVICE PROVIDER QUALITY OF SERVICE

(75) Inventors: Sunbir Gill, Irvine, CA (US); Matthew A. Jones, Ladera Ranch, CA (US); Ameesh Paleja, Irvine, CA (US)

(73) Assignee: Amazon Technologies, Inc., Reno, NV (US)

( * ) Notice: Subject to any disclaimer, the term of this patent is extended or adjusted under 35 U.S.C. 154(b) by 18 days.

(21) Appl. No.: 13/168,883

(22) Filed: Jun. 24, 2011

(51) Int. Cl.
*H04W 24/00* (2009.01)
*H04W 72/00* (2009.01)
*H04M 1/64* (2006.01)

(52) U.S. Cl.
USPC ............... 455/466; 455/456.1; 455/452.2; 379/88.12

(58) Field of Classification Search
USPC ............ 709/227, 235, 248, 217; 455/413, 455/466, 412.1, 456.1; 379/88.01, 88.03, 379/88.12
See application file for complete search history.

(56) References Cited

U.S. PATENT DOCUMENTS

| | | | |
|---|---|---|---|
| 8,060,065 B1 * | 11/2011 | Lai et al. | 455/413 |
| 2001/0044835 A1 * | 11/2001 | Schober et al. | 709/217 |
| 2005/0186944 A1 * | 8/2005 | True et al. | 455/413 |
| 2010/0216427 A1 * | 8/2010 | Poranen | 455/410 |
| 2011/0077026 A1 * | 3/2011 | Cousins et al. | 455/456.2 |
| 2011/0131331 A1 * | 6/2011 | Brunson et al. | 709/227 |
| 2012/0077467 A1 * | 3/2012 | Fan et al. | 455/414.1 |

* cited by examiner

*Primary Examiner* — Nizar Sivji
(74) *Attorney, Agent, or Firm* — Knobbe, Martens, Olson & Bear, LLP

(57) ABSTRACT

A Short Message Service ("SMS") provider's quality of service, such as SMS transmission latency and/or success rate, is measured based on collected event data. A notification service initiates SMS message transmissions which are sent through an SMS provider and a carrier before reaching a mobile service on a mobile device. Each SMS message includes a unique identifier. The notification service creates send events recording when each SMS message was sent. The mobile service creates receipt events recording when each received SMS message was received. By determining how many sent messages are received, and aggregated time differences between messages being sent and received, quality of service information can be determined. In some embodiments, quality of service information is determined on a per-SMS provider basis, and/or on a per-location basis.

29 Claims, 7 Drawing Sheets

ANALYSIS OF MESSAGE SERVICE PROVIDER QUALITY OF SERVICE

BACKGROUND

Short Message Service ("SMS") is a widespread standard for text-based communication. SMS communication uses text messages, each of up to 160 text characters in length, which are sent to a particular target address, such as a phone number associated with a mobile phone. Devices and services other than mobile phones are also capable of sending and receiving SMS messages. Additionally, SMS messages may be sent by broadcast to a number of recipients. SMS messages are used for a variety of purposes, including personal communication, social media, news, advertising and alerts.

SMS providers offer services for the delivery of SMS messages, such as to mobile devices connected to cellular networks. Examples SMS providers include MX Telecom and OpenMarket. For example, an SMS provider may provide services for bulk, recurring and/or automated delivery of SMS messages. SMS providers may act as SMS gateways, allowing services and systems other than mobile phones to send SMS messages to mobile phones. For example, an SMS provider may allow its customers to communicate with it over an electronic network in order to submit requests for the delivery of SMS messages.

The final step in SMS delivery to some mobile phones involves the transmission of the SMS message from a cellular tower on a mobile network to which the mobile phone is connected. Therefore, the ability to send SMS messages to many different mobile phones may involve communication with each of the mobile phones' respective mobile carriers. An SMS provider may act an aggregator where the SMS provider has contracts with a number of mobile carriers. The SMS provider may have access to each contracted mobile carrier's SMS Center, which allows the SMS provider to send and/or receive SMS traffic into and out of the mobile carrier's network. An SMS provider may then sell services which allow its customers to send SMS messages to mobile phones on a variety of networks through a single contract with the SMS provider.

Often, an SMS provider's involvement with SMS delivery ends at the SMS provider's interface with a mobile carrier. The SMS provider may be unable to track whether an SMS message that it sends to the mobile carrier is ultimately received by the intended mobile device recipient, and if so, what latency was associated with the SMS transmission. As this quality of service information may be unavailable to the SMS provider, the SMS provider may be unable to provide quality of service information to its customers. A customer may wish to know the quality of the service that it is paying an SMS provider for. For example, by comparing quality of service information for different SMS providers, customers may be able to make more informed decisions in their selection of SMS providers.

BRIEF DESCRIPTION OF THE DRAWINGS

The accompanying drawings, which are incorporated in and form a part of this specification, illustrate example embodiments of the inventive subject matter, and in no way limit the scope of protection. The accompanying drawings include an example of a possible graphical user interfaces for use with the disclosed system and methods. Other embodiments are contemplated using alternate hardware and/or software platforms, and using significantly different interfaces. The accompanying drawings illustrate embodiments wherein.

DETAILED DESCRIPTION OF SPECIFIC EMBODIMENTS

Figure 1:
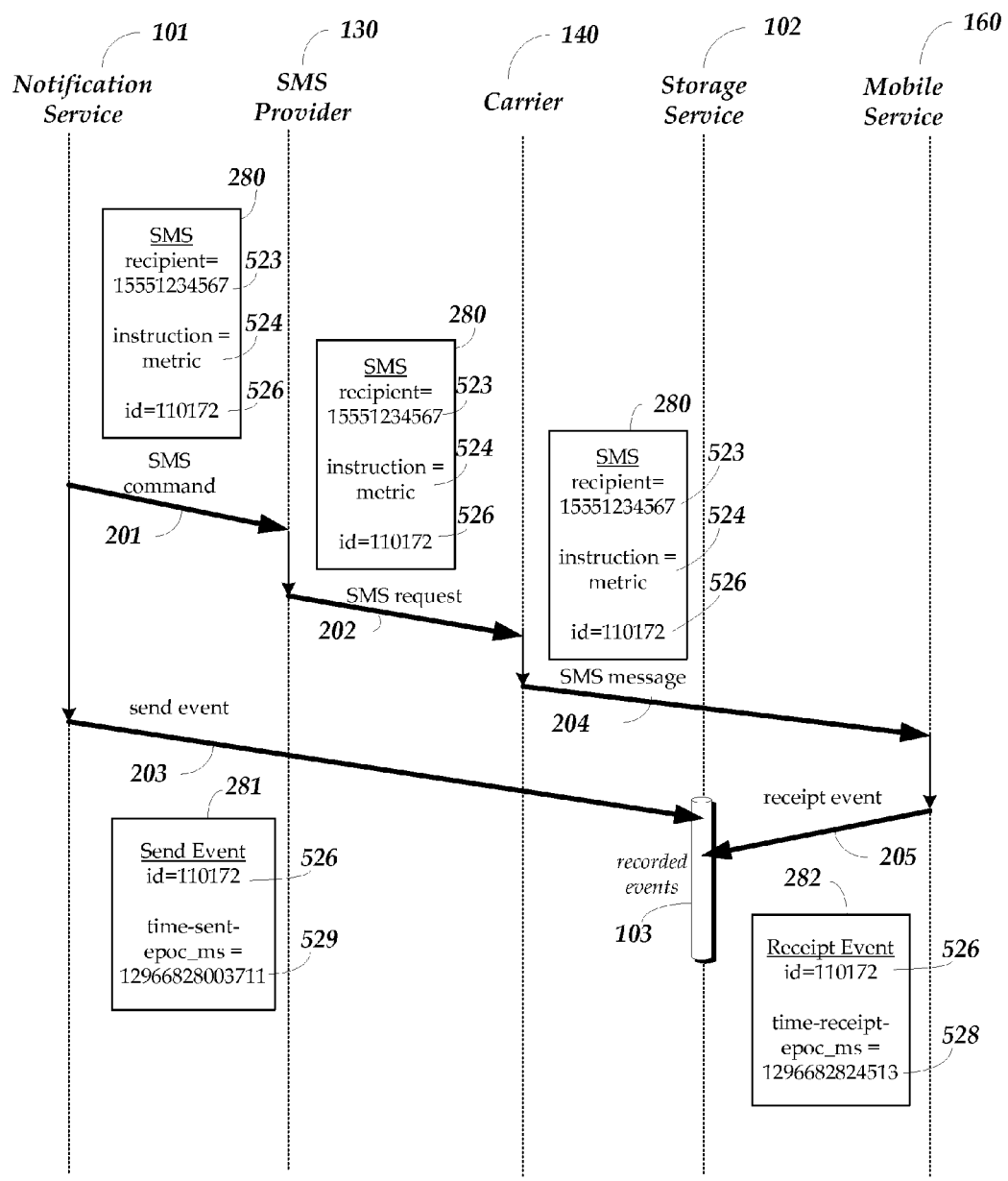
FIG. 1 illustrates a series of interactions amongst elements which may be involved in the transmission of an SMS message and the gathering of information relevant to the quality of service of that transmission, for example in the embodiment of the system in FIG. 2.

FIG. 1 shows one example method through which data may be gathered relating to an SMS provider's quality of service. In this embodiment, a number of components are involved in the transmission of an SMS message and the creation and storage of data which characterizes the quality of that transmission. These components include a notification service 101, an SMS provider 130, a carrier 140, a storage service 102 and a mobile service 160. The illustrated method seeks to gather data identifying when the transmission of an SMS message 280 began and when that SMS message 280 was received by its intended recipient. Quality of service analysis can then be performed on that gathered data.

The notification service 101 initiates the transmission of the SMS message 280 and creates a send event record 281 which includes a unique identifier 526 for that SMS message and the time at which the SMS message transmission began 529. The SMS message is ultimately received by the mobile service 160 running on the recipient's mobile phone. The mobile service 160 determines that the received SMS message 280 is related to the quality of service measurement by identifying an instruction 524 contained within the SMS message 280. The mobile service records the time at which it received the SMS message 528. This time is placed in a receipt event 282 which also includes the SMS message's unique identifier 526.

In the present embodiment, both the notification service's send events 281 and the mobile service's receipt events 282 are transmitted to a storage service 102 which stores the recorded events 103. This allows for a later analysis of the recorded events 103 in order to determine the SMS provider's quality of service. For example, by determining what percent of send events share a unique identifier with a receipt event, the SMS provider's success rate can be determined. As another example, a SMS transmission's latency can be determined by calculating the difference between a receipt event's 282 receipt time 528 and the send time 529 stored in a send event 281 having the same unique identifier 526 as the receipt event 282. By aggregating and analyzing a number of these send/receipt pairs, more accurate latency data can be determined, such as mean and/or median latency for the SMS provider.

As illustrated in FIG. 1, the process of transmitting an SMS message 280 from the notification service 101 to the intended recipient includes multiple steps. The notification service 101 issues an SMS command 201 to the SMS provider 130. The SMS command 201 may take the form of a software-based instruction, such as a function call to an application programming interface ("API") of the SMS provider. As another example, the SMS command 201 may be a message sent to the SMS provider by any of a variety of protocols, standards, and/or computer-based languages such as HTTP, XML, JavaScript, and others. It will be understood that all transmissions described herein may use one or more of these or other protocols, standards, or languages and that descriptions of specific embodiments are in no way limiting.

The SMS command 201 includes the contents of the SMS message 280, including the intended recipient 523, the SMS message's identifier 526, and an instruction 524. The recipient 523 may be specified by a phone number. The instruction 524 may be a specific string of characters indicating that the SMS message 280 corresponds to the measurement of quality of service. This may help to avoid mistaking other messages for quality of service messages, and vice versa. In other embodiments, one or more of these components may be omitted from the SMS message 280 and/or the SMS command 201. For example, an instruction metric 524 may be omitted. The mobile service which receives the SMS message without an instruction metric may, for example, record all incoming SMS messages or may determine whether the received SMS message is associated with quality of service measurement through some other means.

In the embodiment of FIG. 1, the notification service 101 creates a send event 281 after sending the SMS command to the SMS provider 201. The send event 281 includes the unique identifier of the SMS message 526 and the time at which the notification service 101 transmitted the SMS command 201 containing the SMS message 280. As will be explained in further detail below, in other embodiments the send event 281 includes a time relating to some other event during the transmission of the SMS message 280. The send time 526 may be stored in any of a variety of formats. For example, it may be stored in YYYY:MM:DD:HH:MM:SS:micro second format, in epoc time in milliseconds, or in any of time format. Furthermore, it will be understood that storing an item may occur by storing data derived from that item, such as a hash value. For example, another embodiment may store a hash value of the identifier 526 rather than the identifier 526 in its initial format.

According to the present example, the notification service 101 transmits the send event 203 to the storage service 102. As has been described, such transmissions between components may use any of a variety of protocols, standards, and/or languages. The storage service 203 receives the send event and stores it in a data store of recorded events 103. The data store 103 may use any of a variety of storage techniques and/or standards, including a relational database such as SQL, a flat file, and/or a table.

In the described embodiment, the SMS provider 130 receives the SMS command 201 sent from the notification service 101 and, in response, sends an SMS request 202 to a carrier 140. The carrier may be a cellular network carrier such as AT&T, T-Mobile, Sprint, Verizon, Orange, China Mobile, or SingTel. Carriers other than cellular network carriers are also envisioned, as the SMS standard is not restricted to cellular network uses. The SMS request 202 includes the information specific to the SMS message being transmitted 280, including the recipient 523, the instruction 524 and the identification 526. In the present example, the instruction 524 and identification 526 are included as contents of the maximum 160 text character SMS message while the recipient 523 is used to describe where the SMS message is to be sent. The SMS provider may interface with a plurality of carriers and may determine which carrier to send the SMS request 202 to based on the recipient included in the received SMS command 201. For example, the SMS provider may use a lookup service or table to determine which cellular network a particular phone number is associated with. In most circumstances, the carrier 140 should transmit the SMS message 204 to the recipient after receiving the SMS provider's 130 SMS request 202.

According to the embodiment of FIG. 1, the SMS message is received by a mobile service 160 on the recipient's mobile phone. In one embodiment, the mobile service 160 is an application running in the background of a mobile device's operating system, such as Google's Android, Apple's iOS, or Microsoft's Windows Phone OS. The mobile service 160 may act as a daemon listening for events and responding to them. When the mobile device receives a SMS message, the mobile service 160 may determine whether the message relates to quality of service measurement. For example, the mobile service 160 may look for an instruction 524 within the received SMS message 280. If the SMS message is determined to relate to SMS transmission quality analysis, the mobile service 160 creates a receipt event 282. The receipt event includes the unique identifier found in the received SMS message 526. The receipt event may also include the time 528 at which the mobile service 160 and/or a device which the mobile service 160 is resident upon received the SMS message 280. As with time recorded for a send event 529, this receipt event time entry 528 may be of any of a variety of formats.

The mobile service 160 transmits the receipt event 205 to the storage service 102. The storage service 102 stores the receipt events 282 within a data store for recorded events 103. While the present embodiment illustrates both receipt events 282 and send events 281 being transmitted to and stored by the same storage service 102, in another embodiment the different types of events are transmitted to and stored by separate storage services. Additionally or alternatively, multiple storage services may be used to store one or both types of events. The storage service 102 or some other service may then make the recorded events 103 available for analysis.

Figure 2:
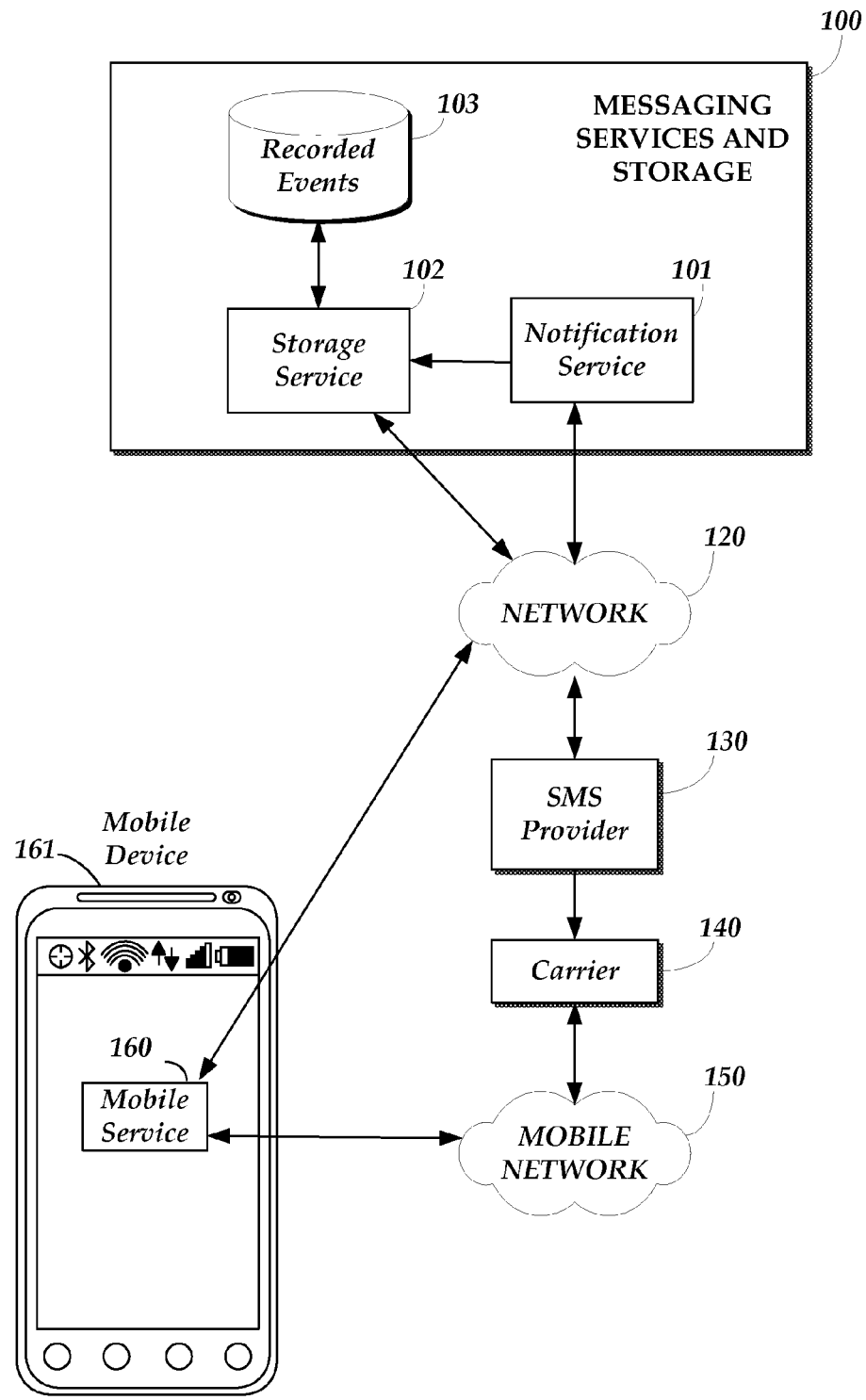
FIG. 2 depicts one embodiment of a system capable of gathering information relevant to the quality of service of an SMS provider.

Referring to FIG. 2, an embodiment of a system capable of performing the method described in FIG. 1 is shown. FIG. 2 shows one possible arrangement of many of the components discussed above in reference to FIG. 1. For example, messaging services and storage 100 are shown which include a notification service 101, a storage service 102 and a recorded events data store 103. In one embodiment these three components are contained on common computer hardware, such as a server. In another embodiment, these components are distributed across different hardware, and/or are provided in a cloud-based manner.

The notification service 101 is shown in communication with the storage service 102, for example in order to send send events to the storage service 102. The storage service 102 communicates with the recorded events data store 103 in order to store events. The notification service is also in communication with a network 120, such as the Internet. The notification service 101 may communicate with the SMS provider 130 through the network 120. The SMS provider is in communication with a carrier 140. In one embodiment, this communication utilizes a network, such as the Internet, which may be the same network which the notification service 101 uses to communicate with the SMS provider 130. In another embodiment, another communication path is used between the SMS provider 130 and the carrier 140.

The carrier 140 is connected to a mobile network 150, for example the carrier may be a cellular telecommunications carrier which operates a mobile cellular phone network and uses that network to transmit SMS messages to mobile devices connected to the network. In another embodiment, the carrier 140 is able to transmit SMS messages to mobile devices on other mobile networks, for example through roaming agreements with other carriers. This allows a SMS message transmitted to the carrier by an SMS provider to reach its intended recipient even if that recipient is then connected to another carrier's mobile network. This situation may result in increased latency and/or decreased success rate of the SMS transmission.

The present embodiment includes the mobile service 160 operating on a mobile device 161. The mobile service 160 may include software written in any of a number of computer languages, for example Java, JavaScript, C#, C++, and/or HTML5. The mobile device 161 may comprise any of a variety of hardware elements, such as those found within modern smartphones such as the HTC EVO, the Samsung Galaxy, the Applie iPhone, the HTC Trophy, and the Nokia N97. Additionally or alternatively, mobile devices other than modern smartphones may be used. For example, a feature phone may include a version of the mobile service 160 designed to function on the feature phone's resources. In another embodiment, a tablet device or laptop computer is used as the mobile device 161 and an appropriate version of the mobile service 160 is used on that device. In another embodiment, the mobile service 160 is used in connection with the mobile device 161 but is not installed or running on the mobile device 161. For example, the mobile service 160 may be provided in a distributed, hosted, cloud-based, and/or web-based manner.

In the illustrated embodiment, the mobile service 160 may operate, for example, as a background agent, daemon, application and/or process on the mobile device and act upon SMS messages received by the mobile device 161. The mobile service 160 is in communication with a network 120 through which it is able to send receipt events to the storage service 102. Although FIG. 2 shows the mobile service 160 as connected directly to the network 120, in practice the mobile service may access the network 120 through the mobile network 150. In other situations and/or embodiments, the mobile service uses other communications paths to communicate with the storage service 102. For example, the mobile device may use a 3G or 4G cellular data connection or an 802.11 Wi-Fi data connection in communicating with the storage service 102. In another example, the mobile service 160 may transmit the receipt event as an SMS message. The mobile service 160 may cache the receipt events before transmitting them. For example, the mobile device 161 may not always be connected to a network and the mobile service 160 may transmit stored receipt events once the opportunity arises to do so.

Although certain embodiments are described using terminology for particular types of devices, it will be understood that the invention is not limited to any of these specific embodiments. For example, a mobile service need not be on a mobile phone. It could alternatively or additionally be on a device such as a computer, tablet, or other personal electronic device capable of receiving SMS messages. Furthermore the disclosed methods are also applicable to other messaging standards, including Multimedia Message Service ("MMS") and other messaging standards presently in existence and/or which may be used in the future. The use of the term "SMS" in no way limits the applicability of the invention to determining quality of service for other messaging protocols.

Figure 3:
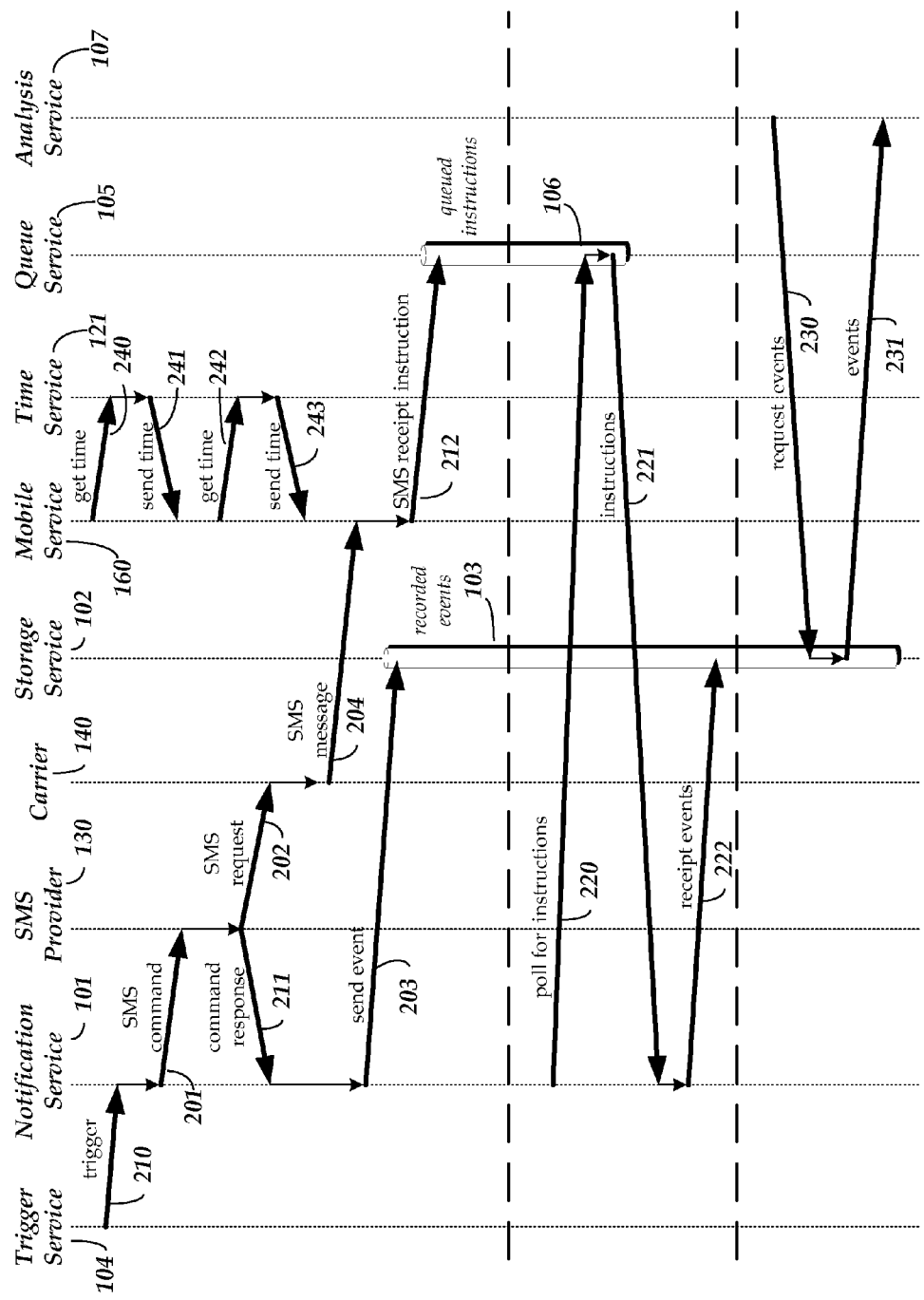
FIG. 3 illustrates another series of interactions amongst elements which may be involved in the transmission of an SMS message and the gathering of information relevant to the quality of service of that transmission, for example in the embodiment of the system of FIG. 4.

Referring next to FIG. 3, another embodiment of a method for determining a SMS provider's quality of service is illustrated. Many of the components and steps are in common with those described in FIG. 1. The embodiment of FIG. 3 contains certain changes and additions to illustrate an alternate implementation. Many other implementations may be used within the scope of the invention. The SMS transmission process shown in FIG. 3 is initiated by a trigger service 104 which sends a trigger 210 to the notification service 101. In one embodiment, the trigger service 104 is software functioning on a cloud-based server system in order to send recurring trigger messages to the notification service 101. Such trigger events 210 may occur, for example, at regular or random intervals. The trigger event 210 may take the form of any message, such an API call to the notification service 101. In another embodiment, the trigger service alters the frequency of trigger events 210 in order to allow for the generation of SMS quality of service data representing a system under different load conditions.

As shown in FIG. 3, after the notification service 101 receives the trigger event 210, it transmits a SMS command 201 which is received by the SMS provider 130 (it will be understood that the term "event" may be used either to describe an action or occurrence, or data representative of that action or occurrence). In the present embodiment, the SMS provider 130 transmits a command response to the notification service 101 in response to the SMS command 201. The command response 211 may indicate that the SMS provider 130 has transmitted an SMS request 202 to a carrier 140. The command response 211 may also include the time at which the SMS request was transmitted 202. The notification service 101 creates a send event which includes a time relating to the SMS provider's 130 transmission of the SMS request. In one embodiment, the send event time is contained in the command response 211. In another embodiment, the send event time is the time that the command response 211 was received by the notification service 101. In another embodiment, the carrier sends a confirmation to the SMS provider when the SMS has been transmitted and the SMS provider sends a command response which includes that time of transmission by the carrier 140. It will be appreciated that, even in such a circumstance where a carrier provides confirmation that an SMS message has been transmitted, it may still be helpful to confirm receipt of the SMS message through use of a mobile service 160 as this provides full end-to-end transmission confirmation.

The mobile service 160 of FIG. 3 includes time-synchronizing functionality. The mobile service 160 may update a clock which is internal to the mobile service 160 and/or the mobile device upon which the mobile service 160 operates. In the present embodiment, the mobile service 160 communicates with a time service 121 in order to update this clock. The time service may be a Network Time Protocol ("NTP") server, such as the public NTP server offered by the Untied States Naval Observatory. The mobile service 160 may request the time 240 from the time service 121, which in response should send the time 241 to the mobile service 160, for example using NTP. In one embodiment, the mobile service performs periodic time requests 240, 242 in order to keep its time updated by receiving multiple time updates 241, 243. In some embodiments, the notification service 101 performs similar time updating functionality so that its associated clock or clocks are also accurate, for example by synching to the same time service 121 as the mobile service 160 syncs to. In some embodiments, the mobile service 160 and/or notification service 101 may communicate with a pool of time services 121 representing different NTP servers. This may provide for increased time accuracy, for example by averaging the times reported from the different servers. Additionally or alternatively, the mobile service may update its time using a time request 240 and resulting time receipt 241 after receiving an SMS message 204. Time-synchronizing functionality, such as the embodiments described, may increase the accuracy of the determination of SMS transmission quality of service because small clock inaccuracies could skew resulting quality of service data. The mobile service 160 may use its relatively accurate, synchronized clock when it stores the receipt time in a receipt event. The notification service may perform similar functionality in providing for the accuracy of the send times stored in send events. Additionally or alternatively, clock accuracy may be provided by one or more of the systems upon which the notification service and/or mobile service operate. For example, the notification service may refer to the clock of an operating system upon which it resides and that operating system may be responsible for keeping its clock accurate using NTP.

In the present embodiment, the mobile service 160 transmits receipt events as contents of transmitted SMS receipt instructions 212. An SMS receipt instruction may include an SMS receipt event and other information, such as instructions on where the receipt event is to be delivered or the time it is to be queued. After receiving an SMS message and creating a corresponding receipt event and an SMS receipt instruction related to that receipt event, the mobile service 160 transmits the SMS receipt instruction 212 to a queue service 105. The queue service 105 of the present embodiment is a cloud based hosted queue service to store messages as they travel between the mobile service and the notification service. This provides flexibility because the notification service does not need to retrieve the receipt events until it is ready to do so. At the same time, the mobile service 160 is able to transmit a receipt event in the form of an SMS receipt instructions whenever it is prepared to do so. In other embodiments, alternate queue services may be used.

Upon receiving the SMS receipt instruction 212 transmitted by the mobile service 160, the queue service 105 stores them in a queued instruction data store 106. In this example, the notification service 101 periodically polls the queue service 105 for queue instructions 220. The queue service 105 responds by transmitting queued instructions 221 to the notification service 101. The queue service 105 may cease to store instructions after they have been transmitted. Upon receiving the instructions 221 from the queue service 105, the notification service 101 sends the receipt events contained within those instructions 222 to the storage service 102 for storage. In other embodiments, a service other than the notification service 101 performs the tasks of polling the queue service for instructions 220, receiving the instructions 221 and transmitting the associated receipt events 222 to the storage service 102.

FIG. 3 also illustrates an analysis service 107 which retrieves recorded events 103 and analyzes them in order to determine quality of service information for one or more SMS providers. The analysis service requests events 230 from the storage service 102 and receives events in response 231. Types of events include send events and receipt events. A successful SMS message transmission should have resulted in a send event and a receipt event sharing a common unique identifier. Each event should have a time value indicating when the corresponding action took place. The analysis service 107 may determine the latency of the SMS transmission by comparing the send event's time value with the receipt event's time value. The analysis service 107 may additionally or alternatively determine SMS success rate, for example by calculating the percent of send events which have a corresponding receipt event. Other quality of service measurements may also be used.

In the embodiment illustrated in FIGS. 1-3, only one SMS provider is shown. The system may rely on a single SMS provider for all SMS transmission, and may therefore associate all determined quality of service information with that SMS provider. In another embodiment, multiple SMS providers may be used. In some of these embodiments, the system may store data indicating which SMS provider was responsible for which SMS transmission. For example, each send record could record the identity of the SMS provider which the corresponding SMS command was sent to. When performing its analysis of recorded events 103, the analysis service 107 may thus create SMS transmission quality of service information for individual SMS providers. Relative comparisons may be performed between and amongst SMS providers' quality of service.

In some embodiments, location-specific quality of service information is gathered and analyzed. For example, the mobile device housing the mobile service 160 may contain global positioning satellite ("GPS") hardware capable of providing the mobile device's location at the time that the SMS message was received. Other sources of location information may also be used, such as cellular tower triangulation or the location of the cellular tower which transmitted the SMS message to the mobile device. The mobile service 160 may include location-specific information in receipt events. The analysis service, upon gathering those receipt events, may classify latency and success rates based on recipient location. This may reveal that one SMS provider is more reliable in some regions than in other regions. A customer considering a variety of SMS providers may choose to rely on different SMS providers for the delivery of SMS messages to recipients expected to be in different regions based on this location-specific information.

Figure 4:
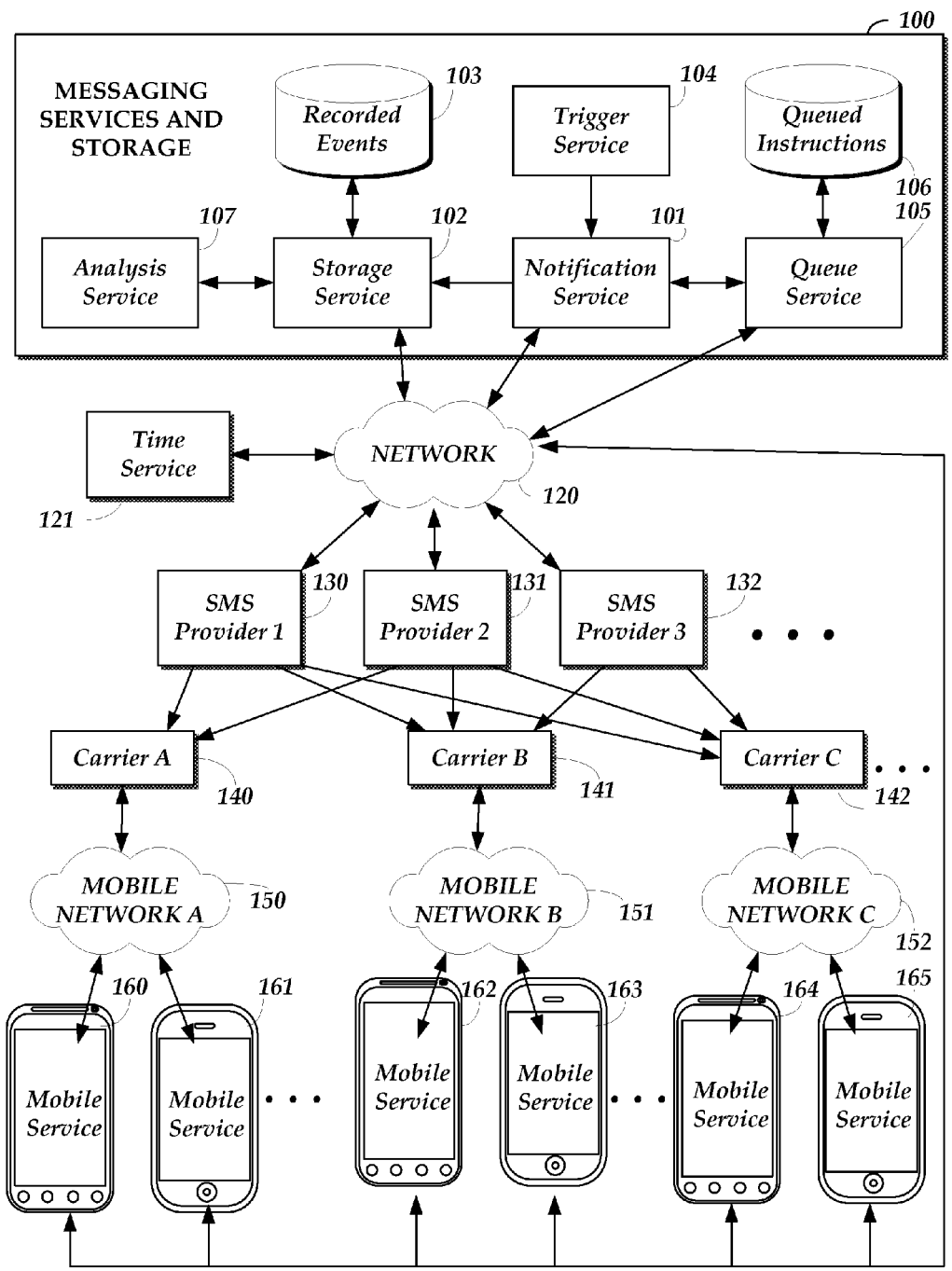
FIG. 4 is depicts another embodiment of a system capable of gathering information relevant to the quality of service of an SMS provider. The embodiment is capable of gathering and analyzing information relevant to a plurality of SMS providers.

Referring to FIG. 4, a system is illustrated which represents one embodiment capable of performing the method described for FIG. 3. The system in FIG. 4 includes a set of service and storage components 100, including a notification service 101, a storage service 102, a trigger service 104, a queue service 105, an analysis service 107, a recorded events data store 103 and a queued instructions data store 106. In the described embodiment, these components correspond to their equally numbered items discussed in the context of FIG. 3. The trigger service 104 is in communication with the notification service 101 in order to transmit trigger events to the notification service 101. The analysis service 107 is in communication with the storage service 102 in order to retrieve events stored within the recorded events data store 103. In other embodiments, the analysis service uses other means of obtaining the recorded events. In the illustrated embodiment, the queue service 105 is connected to a network 120, through which it receives SMS receipt instructions 212 from the mobile service 160. The queue service communicates with the queued instructions data store 106 in order to store and retrieve those instructions. The notification service 101 is in communication with the queue service 105, allowing the notification service 101 to poll the queue service 105 for the instructions then stored. In other embodiments, other means are used by the notification service 101 or other service to obtain the queued instructions from the data store 106.

FIG. 4 further illustrates a time service 121 connected to a network 120. Additional time services may be similarly connected and accessible through the network 120 and/or other networks or other mediums for communication.

The present embodiment includes a number of SMS providers: SMS Provider 1, 130, SMS Provider 2, 131, and SMS Provider 3, 132. There are also a number of carriers: Carrier A 140, Carrier B 141 and Carrier C 142. SMS Providers 1 and 2 are each connected to all three carriers, Carriers A, B and C, while SMS Provider 3 is only connected to some of the Carriers B and C. This may occur, for example, because SMS Provider 3 does not have a contract permitting it to interface with Carrier A. Each of the illustrated carriers is connected with its respective mobile network: Carrier A connected to Mobile Network A, Carrier B connected to Mobile Network B, and Carrier C connected to Mobile Network C. Each mobile network has a plurality of mobile devices connected to it which are running mobile services 160-165. Each mobile network may also have mobile devices connected to it which are not running a mobile service.

Figure 5:
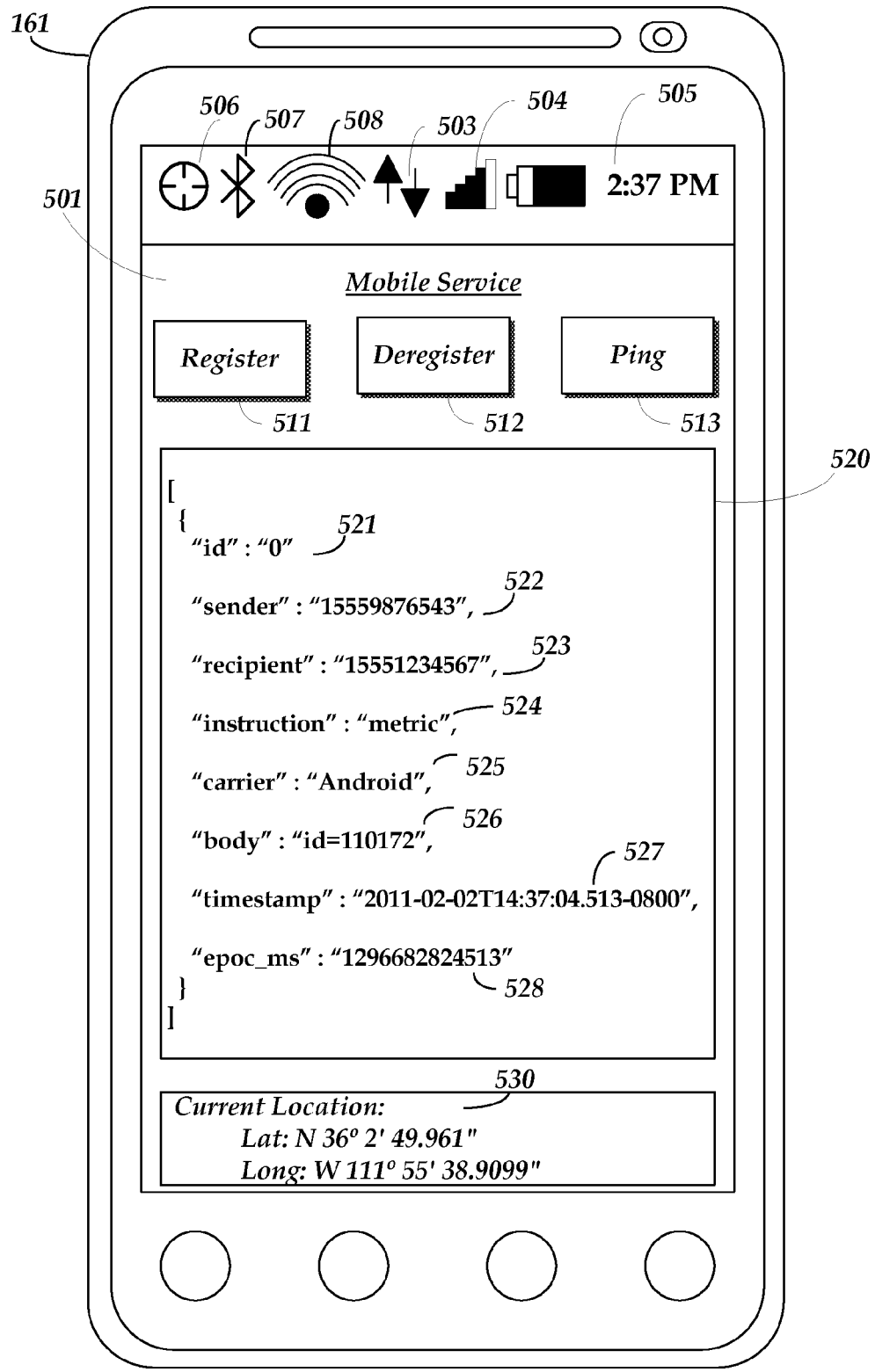
FIG. 5 illustrates one example of an interface on a mobile device which may be used for determining the quality of service of an SMS provider.

Referring to FIG. 5, an example user interface 501 for a mobile service is shown. The mobile service includes status elements 502 which may be provided by the underlying operating system on the mobile device. These may include the mobile service or mobile device's current time 505, which may be updated through synching as described above and may be used in storing SMS receipt times in receipt events. Other status elements 502 include cellular signal strength 504 which may affect whether the mobile device and/or the mobile service are able to obtain SMS messages from a carrier at a particular time. In some embodiments, a mobile service may record data related to its signal strength and such data may be used by an analysis service in evaluating an SMS provider's quality of service. For example, long delays which are attributed to a mobile lacking sufficient signal may not be held against the SMS provider. The mobile device may also include one or more data connections 503 508 503, such as EVDO, LTE WiMAX, 802.11, Bluetooth, 3G cellular, 4G cellular or other network connections. This connection may be used in transmitting data to and from the mobile service, such as the transmission of receipt events from the mobile service to a queue service or storage service.

The present embodiment also includes an indicator that it has an active location-aware measurement 506. In the present example, this is accomplished by use of GPS hardware on the mobile device. The mobile service user interface may display the current location 530 and store related location information in receipt events so that location-specific quality of service analyses may be performed. For example, an analysis service may perform location-specific quality of service analyses and may do so based on aggregated event data associated with many different users. Location may be determined by one or more of a variety of factors or identifiers, such as ZIP code, cell phone tower, GPS-based location, geographic zone, etc. A database of such location-based quality of service data may be used for a variety of purposes and analyses. For example, a service may be used which queries the database and selects an SMS provider based on the contents of the database.

The illustrated mobile service interface 501 includes interface options to register 511 and deregister 512 the mobile service and/or its associated mobile device from the notification system. For example, an embodiment may employ a number of mobile devices in order to gather data concerning SMS quality of service. The notification service includes a recipient for the SMS messages which it transmits. In some examples, the notification service transmits one or more SMS messages to a plurality of recipients. The notification service accesses data indicating the addresses of recipient mobile devices associated with the ongoing SMS quality of service testing. In the present embodiment, this data is populated through mobile services being registered with the system. For example, the user of a mobile device containing a mobile service may select the register button 511 within the mobile service user interface in order to register that mobile device with the system. This could cause the notification service to transmit SMS messages targeted for that mobile device. The mobile service interface also provides an option to deregister 512 the device and/or service from the system. For example, the user may wish to cease receiving test messages.

The user interface shown in FIG. 5 also provides output displays of received SMS test messages 520. In this example, fields included in a received SMS test message are an identification 521 of the message relative to the number of messages received and/or stored by the mobile service; the phone number of the SMS message's sender 522, the phone number of the SMS message's recipient 523, an instruction identifying the SMS message as a metric related to SMS quality of service testing 524; the operating system underlying the mobile service as Android 525; the body of the SMS message as including the unique identifier for the SMS message 526; the time stamp at which the SMS message was received by the mobile service 527; and the time of receipt converted into epoc milliseconds format 528. The interface also provides the user with the ability to ping the notification system 513, for example to test whether it can successfully communicate with the queue service or storage service.

In certain embodiments, quality of service information may be determined according to one or more other metrics. For example, quality of service could be determined for the type of network connection (e.g., 3G cellular data, 4G cellular data, CDMA, GSM, 802.11g, etc.) which a mobile device is using at the time that it receives an SMS message. The mobile service may record this network metric information in receipt events and the analysis service may calculate quality of service information on a per-network basis. As another example, mobile device operating system may be a recorded metric and quality of service information may be determined on a per-OS basis. The mobile service would record the operating system of the mobile device that received the SMS message in the corresponding receipt event and the analysis service could differentiate events accordingly.

Figure 6:
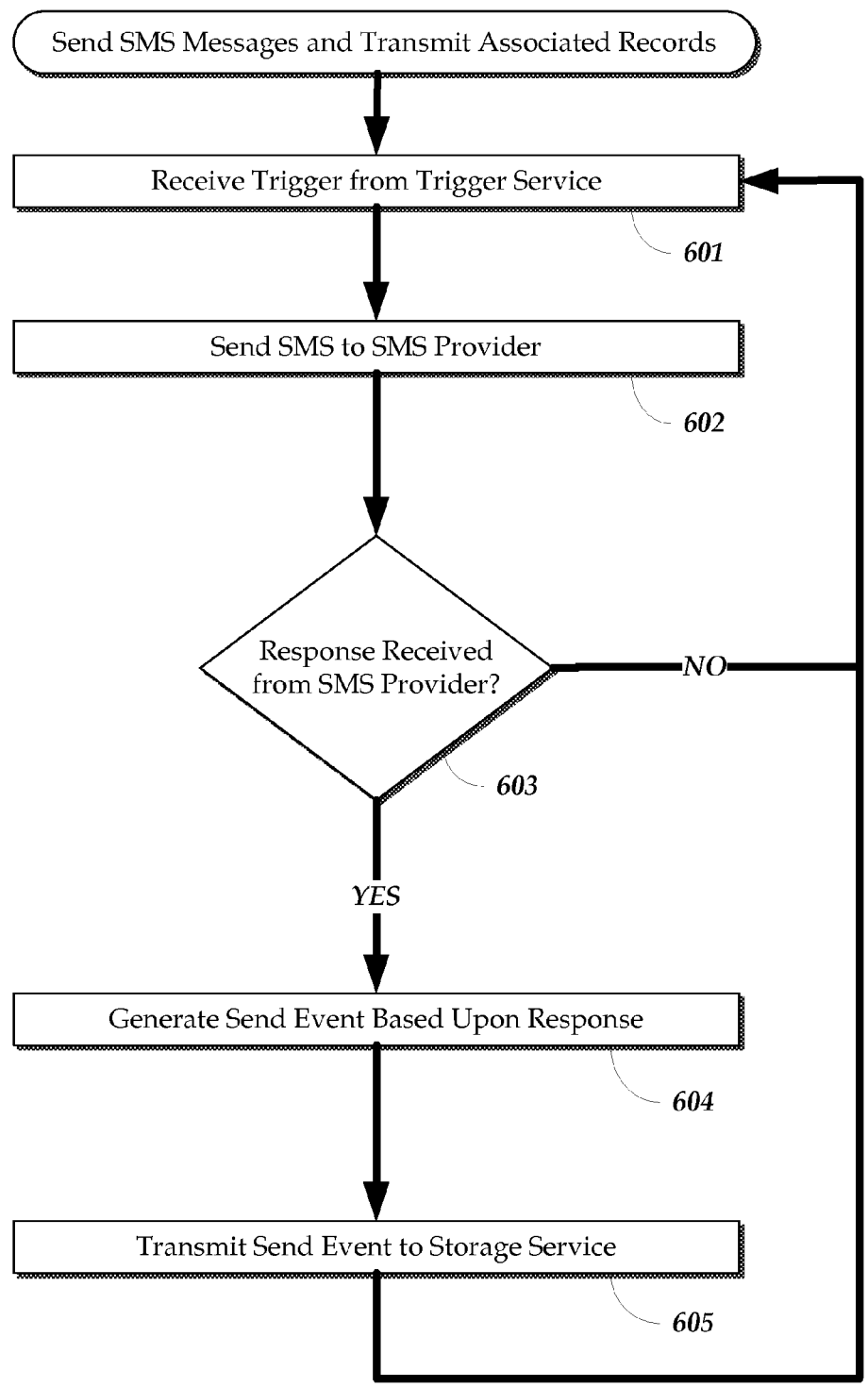
FIG. 6 depicts an illustrative SMS transmission method for sending commands, to an SMS provider, related to transmission of SMS messages and storing data concerning those sent SMS messages.

Referring to FIG. 6, an example method is shown for sending SMS messages and transmitting records associated with those SMS message transmissions. For example, this method may be performed by a notification service. The process begins with receiving a trigger from a trigger service 601. In response, an SMS is sent to an SMS provider 602, for example in the form of an SMS command. It is determined whether a response was received from the SMS provider 603. If a response was received, a send event is generated based at least in part on the response 604. If a response was not received within a certain period of time, the method restarts to waiting for another trigger. After a send event has been generated, the send event is transmitted to a storage service 605 and the method restarts to waiting for another trigger.

Figure 7:
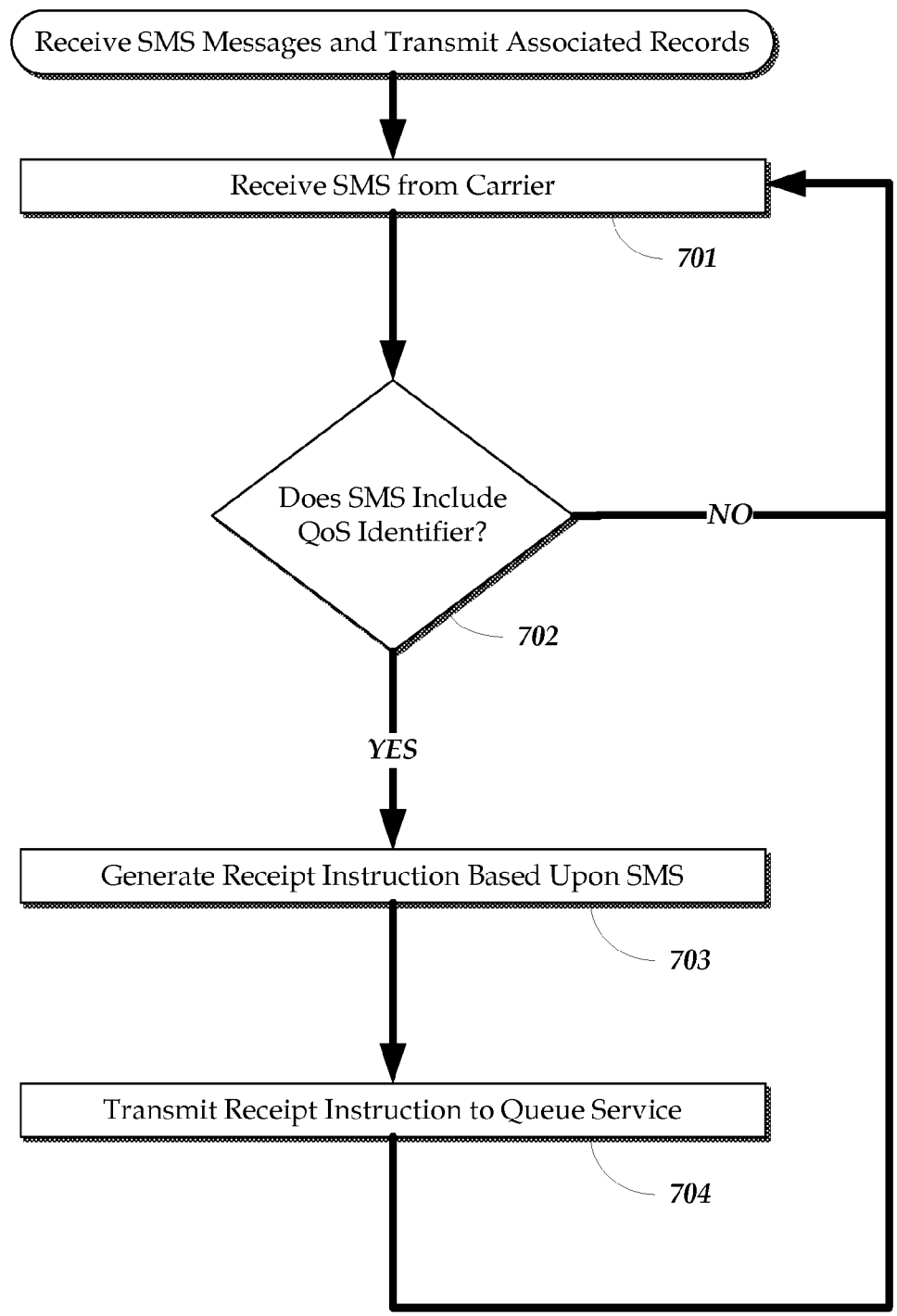
FIG. 7 depicts an illustrative SMS receipt method for receiving SMS messages and transmitting data related to SMS delivery quality of service.

Referring to FIG. 7, an example method is shown for receiving SMS messages and transmitting records associated with those SMS message receipts. For example, this method may be performed by a mobile service. The process begins with receiving an SMS message from a carrier 701. It is determined whether the SMS message includes a quality of service identifier 702, such as a metric instruction. If such an identifier is found, a receipt instruction is generated based, at least in part, on the SMS message 703. If such an identifier is not found, the method restarts to waiting for another SMS message. After a receipt instruction has been generated, the receipt instruction is transmitted to a queue service 704 and the method restarts to waiting for another SMS message.

The system for analyzing a SMS provider's quality of service may be implemented as computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state.

Each of the services 101, 102, 104, 105, 121 shown in FIG. 4 may be implemented in an appropriate combination of computer hardware and software, or in application-specific circuitry. For example, each such service may be implemented in service code executed by one or more physical servers or other computing devices. The service code may be stored on non-transitory computer storage devices or media. The various data repositories 103, 106 may include persistent data storage devices (hard drives, solid state memory, etc.) that store the disclosed data, and may include associated code for managing such data.

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims. Any manner of software designs, architectures or programming languages can be used in order to implement embodiments of the invention. Components of the invention may be implemented in distributed, cloud-based, and/or web-based manners.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A method for determining a message service provider's quality of service, the method comprising:
transmitting a message command to a message service provider, the message service command corresponding to a request for the message service provider to transmit a message to a mobile device, wherein said message service provider is a Short Message Service provider and/or a Multimedia Messaging Service provider, wherein said message is received by the mobile device as a Short Message Service message or a Multimedia Messaging Service message, and wherein said message comprises an identifier;
generating a send event record corresponding to the time at which the message was sent, said send event record comprising said identifier;
storing the send event record;
obtaining receipt data, said receipt data generated by the mobile device in response to the message being received by the mobile device, said receipt data corresponding to the time at which said mobile device received said message, said receipt data comprising said identifier;
storing a receipt event record corresponding to the receipt data, said receipt event record comprising location data identifying a location of the mobile device which received the message; and
making the send event record and the receipt event record available to calculate a measure of the service provider's location-specific quality of service based at least partly on the send event record and the location data in the receipt event record.

2. The method of claim 1 wherein said send event record corresponds to the time at which the message service command was transmitted to said message service provider.

3. The method of claim 1 wherein said send event record corresponds to the time at which said message service provider transmitted a message service request in response to receiving said message service command.

4. The method of claim 1 wherein said send event record corresponds to the time at which a carrier transmitted said message to said mobile device.

5. The method of claim 3 wherein said send event record corresponds to the time at which said message service provider transmitted said message service request to a cellular network carrier.

6. The method of claim 1 wherein transmitting a message service command to a message service provider occurs in response to a trigger received from a trigger service.

7. The method of claim 1 wherein said receipt data is obtained from a queue service which received and queued said receipt data from said mobile device.

8. The method of claim 1 further comprising storing non-receipt data representative of a second message which was transmitted to said message service provider but was not received by said mobile device.

9. The method of claim 8 further comprising using said non-receipt data to determine said message service provider's quality of service.

10. The method of claim 1, further comprising determining said message service provider's quality of service by a process that comprises determining a mean or median latency for delivering messages using said message service provider.

11. The method of claim 1, further comprising determining said message service provider's quality of service by a process that comprises determining a success count or success rate for delivering messages using said message service provider.

12. A non-transitory computer-readable medium having computer-executable instructions for performing a method for providing message service receipt data, the method comprising:

receiving a message containing a unique message identifier, wherein said message is a Short Message Service message or a Multimedia Messaging Service message, and wherein said message was previously transmitted by a message service provider, wherein the message service provider is a Short Message Service provider and/or a Multimedia Messaging Service provider;

generating, in response to said message being received by a mobile device, receipt data based on said message, said receipt data comprising data representative of said unique message identifier and the time at which said message was received; and transmitting said receipt data to an event service configured to store data identifying a location of the mobile device which received the message to enable the receipt data to be used to determine the message service provider's location-specific quality of service.

13. The computer-readable medium of claim 12, said computer readable-medium having computer-executable instructions for performing a method further comprising:

updating a mobile device's stored time by connecting to a time service and receiving current time data from said time service; and using said mobile device's updated stored time as said time at which said message was received.

14. The computer-readable medium of claim 12, wherein transmitting said receipt data comprises transmitting message service receipt instructions to a queue service.

15. The computer-readable medium of claim 12, wherein transmitting said receipt data comprises transmitting a record receipt event to a storage service.

16. The computer-readable medium of claim 12, said computer readable-medium having computer-executable instructions for performing a method further comprising:

obtaining time data from a time service; and updating a time associated with the mobile device based on the time data.

17. The computer-readable medium of claim 16, wherein said time service is a Network Time Protocol server pool.

18. A system for determining a message service provider's quality of service, the system comprising:

a notification service configured to (1) originate a plurality of messages, each message comprising an intended recipient (2) transmit message service commands to said message service provider in order to cause said message service provider to transmit a message service requests to one or more message service carriers, and (3) transmit record send events, each record send event corresponding to a message and including a time at which the message was sent, wherein said message service provider is a Short Message Service provider and/or a Multimedia Messaging Service provider;

a mobile service comprising computer hardware that executes mobile service code configured to receive one or more Short Message Service and/or Multimedia Messaging Service messages and create message service receipt data in response to the receipt of at least one of the messages;

a storage service configured to store record send events, and to store receipt events which correspond to the record receipt data, wherein a receipt event is associated with location data identifying a location of the mobile service when it received the message or messages; and an analysis service configured to determine said message service provider's quality of service for a location based at least in part on send events and receipt events associated with location data corresponding to that location;

wherein each message and its corresponding message service command, message service request, record send event, message service receipt data and receipt event comprise an identifier.

19. The system of claim 18 where a record send event includes a time at which a message service command was transmitted to a message service provider.

20. The system of claim 18 where a record send event includes a time at which a message service request was transmitted to a carrier.

21. The system of claim 18 where a record send event includes a time at which a message service message was transmitted to a mobile device.

22. The system of claim 18 wherein said mobile service is configured to determine whether each received message includes a quality of service identifier and only create message service receipt data for those received messages which include a quality of service identifier.

23. The system of claim 18 wherein said mobile service is further configured to transmit message service receipt instructions to a queue service.

24. The system of claim 23 further comprising a polling service configured to request queued instructions from the queue service, receive instructions transmitted by the queue service, and transmit to said storage service record receipt events corresponding to said received instructions.

25. The system of claim 18 wherein determining said message service provider's quality of service comprises determining a mean or median latency for delivering a message using said message service provider.

26. The system of claim 18 wherein determining said message service provider's quality of service comprises determining a success count or success rate for delivering a message using said message service provider.

27. The system of claim 18 wherein said analysis service is configured to determine said message service provider's quality of service based on data representing aggregated send events and receipt events.

28. The system of claim 18 wherein said analysis service is configured to determine the quality of service related to a plurality of message service providers.

29. The system of claim 18 wherein said analysis service is configured to determine said message service provider's quality of service for a geographic region.

* * * * *